(No Model.)

R. B. WHITZEL.
SNAP HOOK.

No. 287,397. Patented Oct. 23, 1883.

Attest
E. G. Dewald
A. Gluchowsky

Inventor
Russell B. Whitzel
by Wood & Boyd
his Attorneys

UNITED STATES PATENT OFFICE.

RUSSELL B. WHITZEL, OF CINCINNATI, OHIO, ASSIGNOR TO P. WILSON & SONS, OF SAME PLACE.

SNAP-HOOK.

SPECIFICATION forming part of Letters Patent No. 287,397, dated October 23, 1883.

Application filed June 18, 1883. (No model.)

*To all whom it may concern:*

Be it known that I, RUSSELL B. WHITZEL, a citizen of the United States, and a resident of Cincinnati, in the county of Hamilton and State of Ohio, have invented certain new and useful Improvements in Snap-Hooks, of which the following is a specification.

My invention relates to an improvement in a snap buckle or hook designed for use in harness and sadlery or other similar purposes.

The object of my invention is to provide a spring-snap for a harness-buckle or loop-hook, which will permit the snap-bar to be readily removed or inserted over the bar of the shank, and permit the adjustment or removal and interchange of springs.

In snap-hooks hitherto made it has been difficult to replace the springs, which are easily broken, and hence the device becomes useless. My improvement overcomes this difficulty by providing a bar which is detachably pivoted to the shank of the hook, and combined with the spring in such a manner that both can be removed and replaced at pleasure.

Another object of my invention is to avoid the use of rivets and securing the spring to the snap-hook, rendering the same readily detachable, cheaper, more convenient and durable, all of which will be fully set forth in the description of the accompanying drawings.

Figure 1:
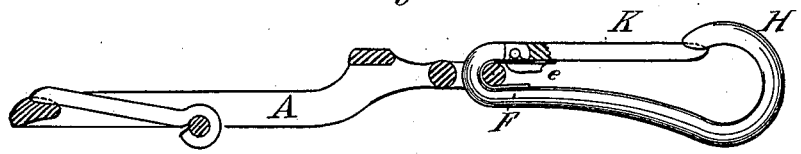
Figure 2:
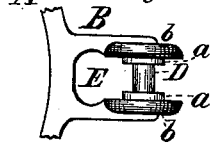
Figure 3:
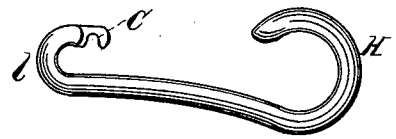
Figures 4, 5:

Figure 1 is a plan view, partly sectional, of my improvement. Fig. 2 is a plan view of the shank and pivot on which the hook hinges. Fig. 3 is a longitudinal elevation of the hook. Fig. 4 is a bottom plan view of the snap-tongue; Fig. 5, a plan view of the spring.

I have represented my improvement as attached to a harness buckle or slide. It may be attached to any ordinary metallic loop.

A represents the buckle; B, a shank cast on and with the buckle; D, a pivot-bar; E, a slot pierced in the shank B behind the pivot D.

$a$ represents annular bosses cast on and with the pivot D, which bosses form a depression or groove within which the loop of the spring F is secured and kept from lateral play.

$b\ b$ represent collars or flanges, which serve as lateral supports against which the loop $l$ on the shank of hook H bears. These flanges $b\ b$ serve to strengthen the hook and pivot.

C represents a catch or notch cut in the free end of the shank of hook H, which is adapted in shape and proportion to engage over pivot I, which is formed in snap-bar K, as shown in Fig. 4.

F represents a spring, which is of U shape, one arm of which, when in position, bears against the lower arm of the loop $l$, passing around the pivot D, and extending forward under and pressing against the rear end of snap bar or tongue K, holding it in firm contact against the end of hook H. The catch C and pivot I serve as a hinge for the snap bar or tongue K, which is held in position by the spring.

E represents a flange on tongue K, preventing play of loop $l$ on the pivot D.

When it is desired to remove the tongue K, pressure is applied upon its rear end, forcing the pivot I and spring F downward a sufficient distance to free the pivot I from contact with the hook C, when the tongue K can be removed, and then the hook C and spring F can be removed from engagement with the pivot D. The parts can be easily put together by reversing the operation.

What I claim as my invention herein is—

1. The shank B of a harness-buckle having the slot E, pivot-pin D, and side flanges, $b\ b$, in combination with a detachable snap-hook having bearings on the pivot-pin and against the side flanges, substantially as described.

2. The combination, with the shank B, of a harness-buckle having the slot E and pivot D, of the hook H, having the loop $l$, provided with the notch $c$, the snap-tongue K, having the pivot I, and the spring F, for retaining the pivot of the tongue in engagement with the notch $c$, substantially as described.

3. In combination with the shank B, and pivot D, spring F, the hook H, and detachable tongue K I, hinged upon pivot D, substantially as herein set forth.

4. A detachable snap-hook, consisting, essentially, of a loop-shank, B, pivot-bar D, spring F, notched hook-loop C H, and snap-tongue K, secured thereto, substantially as herein set forth.

In testimony whereof I have hereunto set my hand.

RUSSELL B. WHITZEL.

Witnesses:
ANDREW E. SCOTT,
A. GLUCHOWSKY.